(12) United States Patent
Jacobson

(10) Patent No.: US 9,781,169 B2
(45) Date of Patent: Oct. 3, 2017

(54) SWITCH CONTROLLER FOR SEPARATING MULTIPLE PORTIONS OF CALL

(71) Applicant: TEVNOS LLC, San Francisco, CA (US)

(72) Inventor: Stuart Alexander Jacobson, San Francisco, CA (US)

(73) Assignee: TEVNOS LLC, San Francisco, CA (US)

( * ) Notice: Subject to any disclaimer, the term of this patent is extended or adjusted under 35 U.S.C. 154(b) by 0 days.

(21) Appl. No.: 15/007,055

(22) Filed: Jan. 26, 2016

(65) Prior Publication Data

US 2016/0219085 A1    Jul. 28, 2016

Related U.S. Application Data

(60) Provisional application No. 62/108,420, filed on Jan. 27, 2015, provisional application No. 62/110,333, filed on Jan. 30, 2015.

(51) Int. Cl.

| | | |
|---|---|---|
| H04W 4/00 | (2009.01) |
| H04L 29/06 | (2006.01) |
| H04L 12/24 | (2006.01) |
| H04W 4/14 | (2009.01) |
| H04M 3/42 | (2006.01) |
| H04M 3/20 | (2006.01) |
| H04M 3/22 | (2006.01) |
| H04W 4/16 | (2009.01) |
| H04W 4/18 | (2009.01) |
| H04M 3/56 | (2006.01) |
| H04W 12/02 | (2009.01) |

(52) U.S. Cl.
CPC ...... *H04L 65/1069* (2013.01); *H04L 41/5064* (2013.01); *H04L 65/602* (2013.01); *H04M 3/20* (2013.01); *H04M 3/2218* (2013.01); *H04M 3/42068* (2013.01); *H04M 3/42221* (2013.01); *H04M 3/568* (2013.01); *H04W 4/14* (2013.01); *H04W 4/16* (2013.01); *H04W 4/18* (2013.01); *H04M 3/564* (2013.01); *H04W 12/02* (2013.01)

(58) Field of Classification Search
None
See application file for complete search history.

(56) References Cited

U.S. PATENT DOCUMENTS

2015/0373474 A1* 12/2015 Kraft ................... H04R 1/1083
381/17

\* cited by examiner

*Primary Examiner* — Suhail Khan
(74) *Attorney, Agent, or Firm* — Polsinelli PC

(57) ABSTRACT

Disclosed herein are systems, methods, and non-transitory computer-readable storage media for collecting call data, feeding call data to applications, and providing advanced call features.

17 Claims, 7 Drawing Sheets

SWITCH CONTROLLER FOR SEPARATING MULTIPLE PORTIONS OF CALL

CROSS REFERENCE TO RELATED APPLICATIONS

This application claims the benefit of U.S. provisional application No. 62/108,420 filed on Jan. 27, 2015, entitled "Switch Controller for Bifurcating Multiple Legs of a Call" and U.S. provisional application No. 62/110,333 filed on Jan. 30, 2015, entitled "Switch Controller for Bifurcating Multiple Legs of a Call" each of which are expressly incorporated by reference herein in their entirety.

BACKGROUND

A Mobile Virtual Network Operator (MVNO) obtains network resources from mobile network operators and resells the assets to its customers. Often MVNOs do not have their own infrastructure and rely on the service providers' call switching and packet switching capabilities. Some MVNOs do operate their own infrastructure; however, known solutions do not provide adequate security and do not deliver a robust package of technical services or convenience features to the people and organizations that use them as a mobile solution.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only example embodiments of the disclosure and are not therefore to be considered to be limiting of its scope, the principles herein are described and explained with additional specificity and detail through the use of the accompanying drawings in which.

DETAILED DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

As explained above, mobile network operators can provide network resources to mobile virtual network operators (MVNOs) and allow the MVNO to resell the resources to customers. Some embodiments of the present technology involve a MVNO system that hosts a platform of services for providing advanced tools to its customers. The platform can be provisioned as a server or virtual machine inside of a datacenter that is in the internal network path of data traffic. For example, the platform can be installed in the mobile network operator's datacenter. While the following disclosure describes switch control, separating portions of a call, and other advanced services with reference to a MVNO system, those having ordinary skill in the art having the benefit of the disclosure will appreciate that the present technology can be utilized by a variety of other operators including a mobile network operator (MNO), a provider of a plain old telephone service (POTS), etc.

Figure 1:
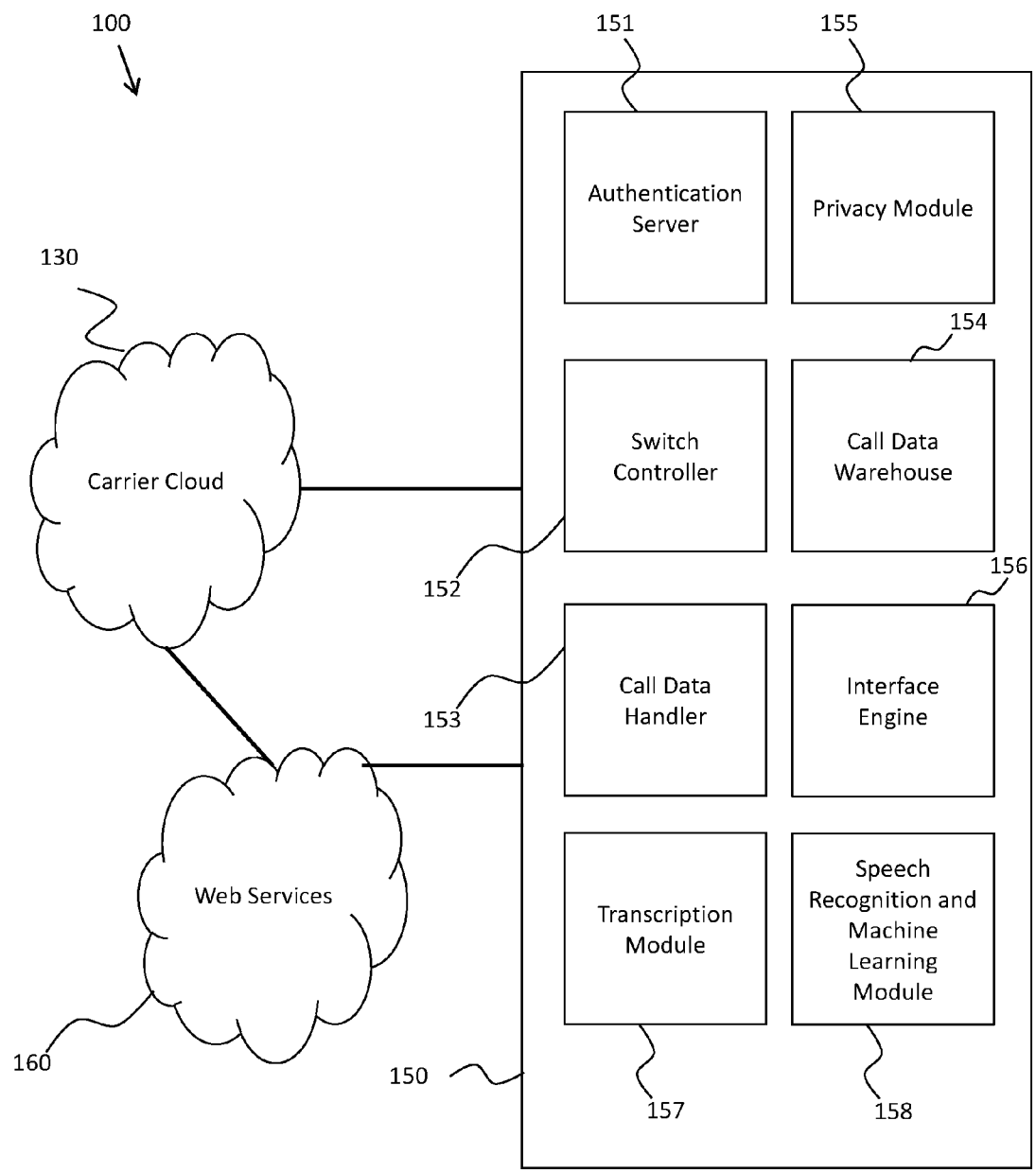
FIG. 1 illustrates an example system for providing advanced services to an enterprise or other MVNO customer endpoint according to some embodiments of the present technology.

FIG. 1 illustrates an example system 100 for providing advanced services to an enterprise or other MVNO customer endpoint according to some embodiments of the present technology. The system 100 includes a carrier cloud 130 coupled with a virtual network service platform 150 hosted by a MVNO. The virtual network service platform 150 can also access web resources 160 from the Internet via the carrier cloud 130 or through private multiprotocol label switching (MPLS) links and application program interface (API) links.

In some embodiments of the present technology, parties can join a call in a variety of ways, e.g. a landline telephone, a cellular phone, a browser-based application using Voice Over Internet Protocol (VOIP), etc. Additionally, the virtual network service platform 150 can support audio as well as video functionality so that some parties can join a call (e.g. via a browser-based VOIP connection) to receive audio and video feeds while other parties can join the call (e.g. via a cellular connection) and receive the audio feeds.

The virtual network service platform 150 can include a wide variety of tools and resources for providing the MVNO's customers with a robust package of technical services and convenience, e.g. via an app or web-based GUI. For example, the virtual network service platform 150 can include an authentication server 151, a switch controller 152, a call data handler 153, a call metadata warehouse 154, a privacy module 155, an interface engine 156, a transcription module 157, and a speech recognition and machine leaning module 158.

In some embodiments of the present technology, the authentication server 151 can employ authentication strategies that are the same or similar to those described in U.S. Provisional Patent Application 62/076,703 entitled "Method and Apparatus for Mobile Authentication," filed on Nov. 7, 2014, United States Provisional Patent Application 62/100,816 entitled "Method and Apparatus for Mobile Authentication," filed on Jan. 7, 2015, and U.S. patent application Ser. No. 14/934,051, entitled "Method and Apparatus for Mobile Authentication," filed on Nov. 5, 2015, each of which are incorporated herein in their entirety.

In some cases, a Mobile Network Operator (MNO) that provides network access to the MVNO allows the MVNO to place switches within their environment. Accordingly, the virtual network service platform 150 can also include a switch controller 152 that allows the MVNO to have full switch control in the MNO's ecosystem.

The switch controller 152 can include a software-defined switch for receiving a call from an originating entity, locating the endpoint of the requested entity, receiving an acceptance from the requested entity, and setting up (i.e., establishing) a call between the originating entity and requested entity.

Switch control functionality can be exposed to the customers of an MVNO through a graphical user interface (e.g. web interface), thereby allowing the customers (e.g., enterprises) to have greater control over their mobile services.

In some embodiments of the present technology, the switch controller 152 can also include advanced switch controls. For example, the advanced switch controls can allow the switch controller to separate the portions (e.g., streams or legs) of a call and work along with a call data handler 153 to collect and warehouse call metadata (e.g., send to call metadata warehouse 154), preserve appropriate audio data, and destroy other audio data. A portion of a call can refer to the voice information (e.g., data or a signal) generated by a participant (i.e., a call between two people can have two portions, with one portion corresponding to each of the participants). Each portion of a call can also include its own metadata. Call metadata can also be a separate portion of the call. Also a portion of a call can be merged. For example, a call portion from a first participant can be merged with a call portion from a second participant and the merged portion can then be sent as one merged portion to a third participant. In addition, one portion can include multiple sub-portions (e.g., a video-conference portion can include an audio portion, video portion, and messaging portion). A portion does not contain easily separable sub-portions (e.g., an audio portion may include multiple speakers) and in some embodiments an algorithm (e.g., speaker identification) can be used to intelligently separate these sub-portions. These sub-portions can be separated, distributed and handled as independent portions, according to the principles herein disclosed. For example, a party can whisper in one portion (e.g., an audio portion is only sent to one party) while fully participating with another portion (e.g., a messaging portion is distributed to all parties). Further, it should be understood that the principles of this disclosure can be applied to other portions of communication data including messaging portions, video portions, etc.

The switch controller 152 can also access the various portions of the separated call and can request that the interface engine 156 create a button, bar, link, object, etc. for providing access to the call or a portion of the call to third parties. In some cases, the third party can listen to both portions of a call (i.e. eavesdrop) and can inject (e.g., merge) audio into only one, isolated portion of the call (i.e. whisper). In a scenario with multiple parties present during a call (i.e. a conference call), the switch controller 152 can separate all the portions and re-join certain portions to allow particular subsets of the conferencing parties to whisper to one or more other party or subset of parties. In other words, whispering can refer to sending one party's portion to only a subset of connected parties and eavesdropping can refer to one party receiving portions from other connected parties without sending the party's portion to all of the connected parties. The terms "whisper" and "eavesdrop" can sometimes refer to the same configuration and should not be considered mutually exclusive. For example, if parties A, B, C, and D are on a call and A's portion is only directed to B but not C or D; A can be considered eavesdropping (on conversation between B, C, and D) as well as whispering (to B).

Switch Control

Figure 2:
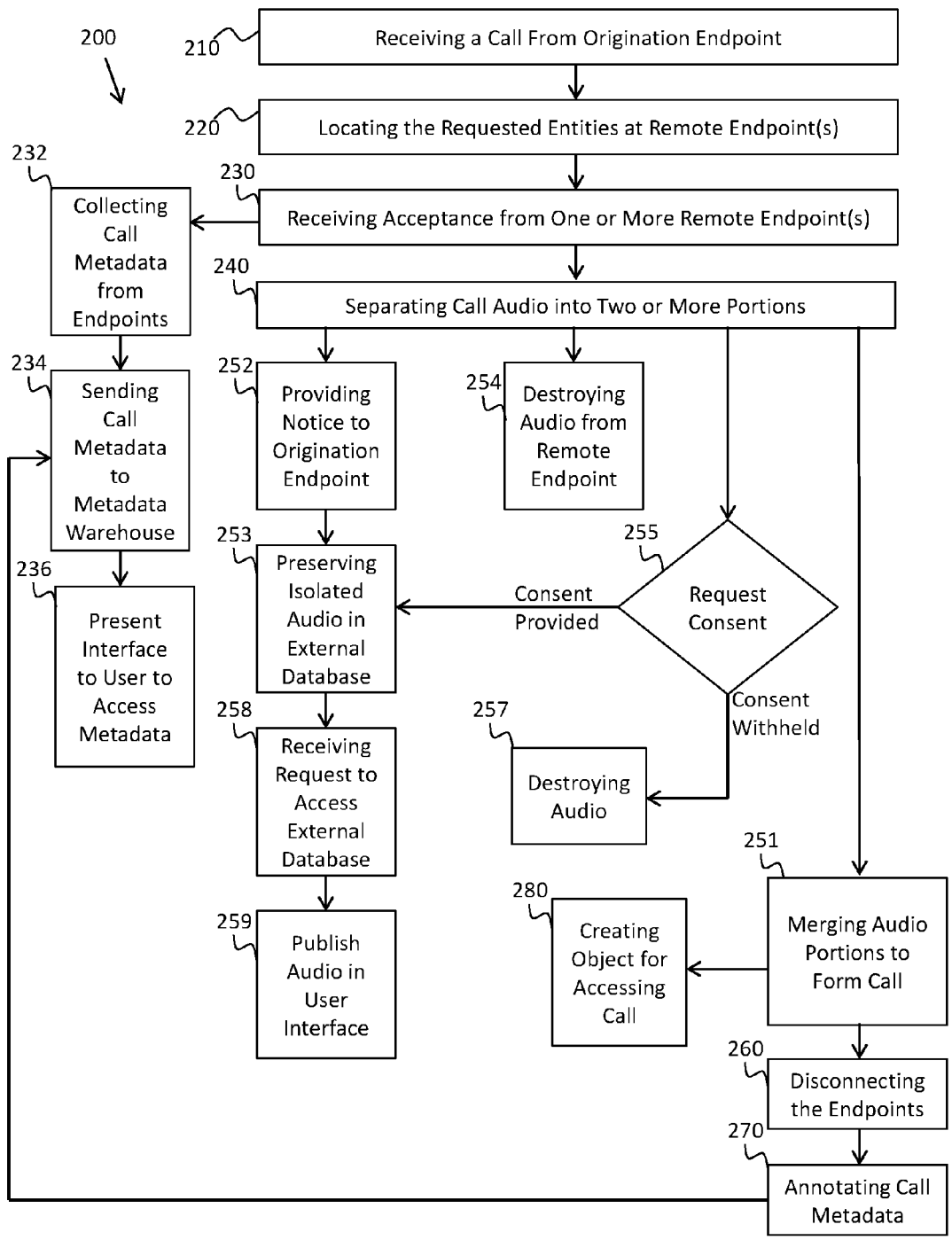
FIG. 2 illustrates an example method of separating the portions of a call using a software-defined switch controller in an MVNO-hosted virtual network service platform according to some embodiments of the present technology.

FIG. 2 illustrates an example method 200 of separating the portions of a call using a software-defined switch controller in an MVNO-hosted virtual network service platform according to some embodiments of the present technology. The method 200 begins with receiving a call from an origination endpoint 210 (e.g. "customer endpoint" i.e. a mobile device of an employee of an enterprise that is a MVNO customer) and locating the requested entities at respective remote endpoints 220. One or more of the requested entities and can then accept the call from the origination endpoint 230. In some embodiments of the present technology, once a remote endpoint accepts a call, the method 200 involves collecting call metadata (e.g. time, location, etc.) about the endpoints 232 and sending the call metadata 234 to a call data warehouse (e.g. in the virtual network service platform). In some embodiments, a privacy module in the virtual network service platform requires informed consent from the remote endpoint before some or all call metadata is collected. After call metadata is collected, the virtual network service platform can poll the call data warehouse and provide the metadata to a user via button, bar, object, link, etc. in an application or web interface 236.

Next, the method 200 involves separating the call audio into two or more audio portions 240 and merging the audio portions 251. In some embodiments, the separated audio portions can include only the isolated audio collected from a respective endpoint. In some other embodiments, the separated audio can include isolated audio from two or more endpoints that are each provisioned by the same enterprise, but isolated from a third party.

A call data handler in a virtual network service platform can handle the various isolated audio portions in a wide variety other ways, as will be explained in greater detail below. For example, the method 200 involves providing notice to the origination endpoint that the call audio will be preserved 252 and preserving the isolated audio from the origination endpoint 253. By preserving only one portion of a call, the person using the remote endpoint does not need to provide any consent or be given a disclaimer in order to comply with certain wiretapping laws.

As mentioned above, the method 200 involves merging the audio portions 251 to form the actual call and creating an object, accessible by an application or web interface, for accessing the merged call through the virtual network service platform 280.

Allowing a party of a call to have their audio isolated and preserved provides many opportunities for advanced call features. For example, since the audio is isolated, additional audio can be injected (e.g., "whispered") to one side of a call without the other side hearing it. Whispering is discussed in greater detail below. In another example, when a user knows that they are being recorded, but that the other party is not being recorded, the user can make statements to preserve the meaning of the other party's words.

Additionally, isolating one portion of call audio allows a user to mute their self in the call, but have their audio still preserved. When muted, the user can make statements privately that can act as notes or annotations for later review during playback.

Also, statements made in isolated audio can be used in connection with a voice recognition system and with an intelligent personal assistant (e.g., Siri, Google Now, Cortana, etc.) The intelligent personal assistant can respond to isolated questions by whispering the responses to only the intended parties of the call instead of to the entire call. The intelligent personal assistant can listen for phrases and perform actions in response. For example, a certain phrase can be used to add additional parties, inject audio to one or more party, etc.

Similarly, the virtual network service platform can provide users (MVNO customers) with dialing tools (e.g. via web, app, etc.) to allow users to enter particular number combinations to perform pre-arranged actions. For example, dialing #45 can add a predetermined additional party to the call as an eavesdropper or whisperer. The use of intelligent personal assistants and dialing tools allows a new class of verbal instructions and dialing tools to handle the call rather than known visual interface tools.

Preserved call audio can also be cached (e.g., stored) and accessed by another person so they can get read/hear the audio before they actually join the call.

Referring again to FIG. 2, the method 200 can treat the audio from the other endpoints in a wide variety of ways. In some cases, the method 200 simply involves disregarding (e.g., deleting, destroying, or otherwise not saving) the isolated audio from the remote endpoints 254 without any preservation. Also, the method 200 can involve requesting consent from the remote endpoints to preserve call audio 255, preserving the audio if consent is given 253, and destroying the audio if consent is withheld 257.

The switch controller can preserve call audio data by sending the isolated audio to an external database. Later, a user (to whom consent has been given) can request call audio from the external database 258 and the call audio data can be published through an application or web interface 259 or API. The external database can provided as part of virtual network service platform 150.

In some embodiments, the switch controller can have a default setting to send call records to the user directly (e.g. via email). The user can then forward, share, or otherwise retransmit the call record to a person, application, service, etc. For example, this can involve sending a call record to a shared calendar which can be designed to be a repository for call records. This also allows a user to annotate such a calendar record with other materials e.g. text messages to a designated bot recipient via a short SMS code. For example, the user can text a calendar bot "start task matter client" followed by "stop" to indicate the end of this block of time and the annotations can be added to the calendar record.

At the conclusion of the call, the switch controller can disconnect the endpoints 260, finish annotating the call metadata 270, and send the call metadata to metadata warehouse 234.

In addition to preserving the call audio data, the virtual network service platform can also provide transcription services. A transcription module can transcribe the call audio data (e.g. via an API, a transcription service, a customer designated transcriber, etc.). The transcription module can also be configured to provide a summary of the call. For example, the transcription module can transcribe the audio, examine the transcription for certain words, and provide lists of commitments made by the parties, next-action follow-ups, etc.

In some embodiments various other methods of separating the portions of a call can be used instead of or in conjunction with the switch controller. For example, a speech recognition module and/or a machine learning module can learn callers' voices and instruct the switch controller to separate the portions of the call based on the presence of learned voices.

As explained above, consent can be required to record call audio data. Consent for preserving can be requested and provided in a wide variety of ways. In some cases, an announcement is made when a party joins the call explaining that the call is being preserved. The announcement can be played to all of the parties or it can be whispered (explained in greater detail below) only to designated endpoints.

Some embodiments involve automatically recording all individuals in all contexts who have previously signed off on all their calls being recorded. For example, employees in an enterprise using a virtual network service platform, as described herein, can be required to sign an agreement to have call data recorded in some or all instances without further consent. Similarly, consultants, contractors, and other service professionals can be required to sign an engagement agreement with the enterprise which allows call data to be recorded without requiring a warning or disclaimer. In some other embodiments, a privacy module in the virtual network service platform requires informed consent before recording call audio.

As described above, the virtual network service platform 150 can include a privacy module 155. The privacy module 155 can enforce announcements pertaining to call recording, request for consent to be recorded, determine when a party has already provided consent to be recorded, etc. The present disclosure further contemplates that the entities responsible for the collection, analysis, disclosure, transfer, storage, or other use of such voice data should implement and consistently use privacy policies and practices that that are generally recognized as meeting or exceeding industry or governmental requirements for maintaining personal information data private and secure. For example, personal information from users should be collected for legitimate and reasonable uses of the entity and not shared or sold outside of those legitimate uses. Further, such collection should occur only after the informed consent of the users. Additionally, such entities would take any needed steps for safeguarding and securing access to such personal information data and ensuring that others with access to the personal information data adhere to their privacy and security policies and procedures. Further, such entities can subject themselves to evaluation by third parties to certify their adherence to widely accepted privacy policies and practices.

The present disclosure contemplates embodiments in which hardware and/or software elements can be provided to prevent or block access to such personal information data. For example, the present technology can be configured to allow users to select to "opt in" or "opt out" of participation in the recording of voice data.

Some embodiments involve granting a third party access to an isolated portion of the call. As explained above, the virtual network service platform can create an object for accessing the call and displaying the object in an application or through a web interface. The object can comprise a bar on a web page that, when clicked, causes a web-based phone interface to be displayed for the third party to connect an isolated call audio portion. The object can display an active call and provide the ability to approved third parties to eavesdrop and whisper to only one of the other parties. In some embodiments, the third party can use the web object to direct the call to his mobile device. Similarly, the user can send a request that the virtual network service platform connect with an SMS application server and send a text message to the third party with a link that can be used to join the call.

When the third party joins a call, they can be provided with a caller id, receive a text message/email, or have the call begin with a narrative explaining the context of call they are about to participate in or hear a more rapidly played back rendition of the call recording to catch up; rapid playback may include accelerating audio rates and eliminating pauses among other technologies to accelerate playback of audio.

Advanced Services

Placing a switch controller in an MVNO-hosted virtual network service platform offers a MVNO customer a wide variety of options for using preserved audio within an enterprise. For example, the virtual network service platform can be used to publish call metadata and preserved audio to third party platforms, such as customer relationship management (CRM) systems. Also, having a switch controller in the platform allows the MVNO the ability to monitor call turn up (i.e., beginning a call) and tear down (i.e., ending a call), thereby allowing the operator the ability to use caller ID information, provide advanced call controls, provide advanced SMS features by interfacing with an SMS application server, etc. These and other advanced features are explained below.

Providing Access to Call Metadata and Preserved Audio

As explained above, a switch placed in an MVNO-hosted virtual network service platform can be used to scrape call metadata such as number dialed, time of call, duration of call, location of parties, etc. for all the parties of a call. Additionally, it is often the case that this type of call metadata can be legally collected even without a party's consent. In some embodiments of the present technology, call metadata for calls being handled by the switch are scraped for metadata and the metadata is warehoused.

A switch controller, an AI bot, etc. in a virtual network service platform can also preserve call audio when the appropriate consent, as explained above. In some cases, the present technology can involve contemporaneously recording and sending the call to the external database).

In some embodiments, call audio data is recorded for all portions of a separated call. When consent is provided by a party to the call, the recorded audio is automatically sent to an external database. In some cases, the virtual network service platform can allow a call to proceed without first asking for consent and later ask for consent. For example, when the switch detects tear down of the call, the virtual network service platform can cause an announcement to be played requesting consent. For example, an announcement can be "This call has been recorded for your convenience, if you would like to access the audio for this call, please press 1 now, if you would like the call audio destroyed, please press 2 or hang up." When the virtual network service platform determines that consent has been given after the call, it can send the recorded audio to the external database. When consent is withheld, the recorded audio is destroyed.

As explained above, the call metadata and recorded and/or warehoused call audio data can be provided to users or to an enterprise via a web link. Additionally, in some embodiments, the call metadata and call audio can be fed directly to another web service, application, or platform through an API. For example, the data can be fed directly to a customer relationship management (CRM) system via an API call between the virtual network service platform and the CRM system.

Figure 3:
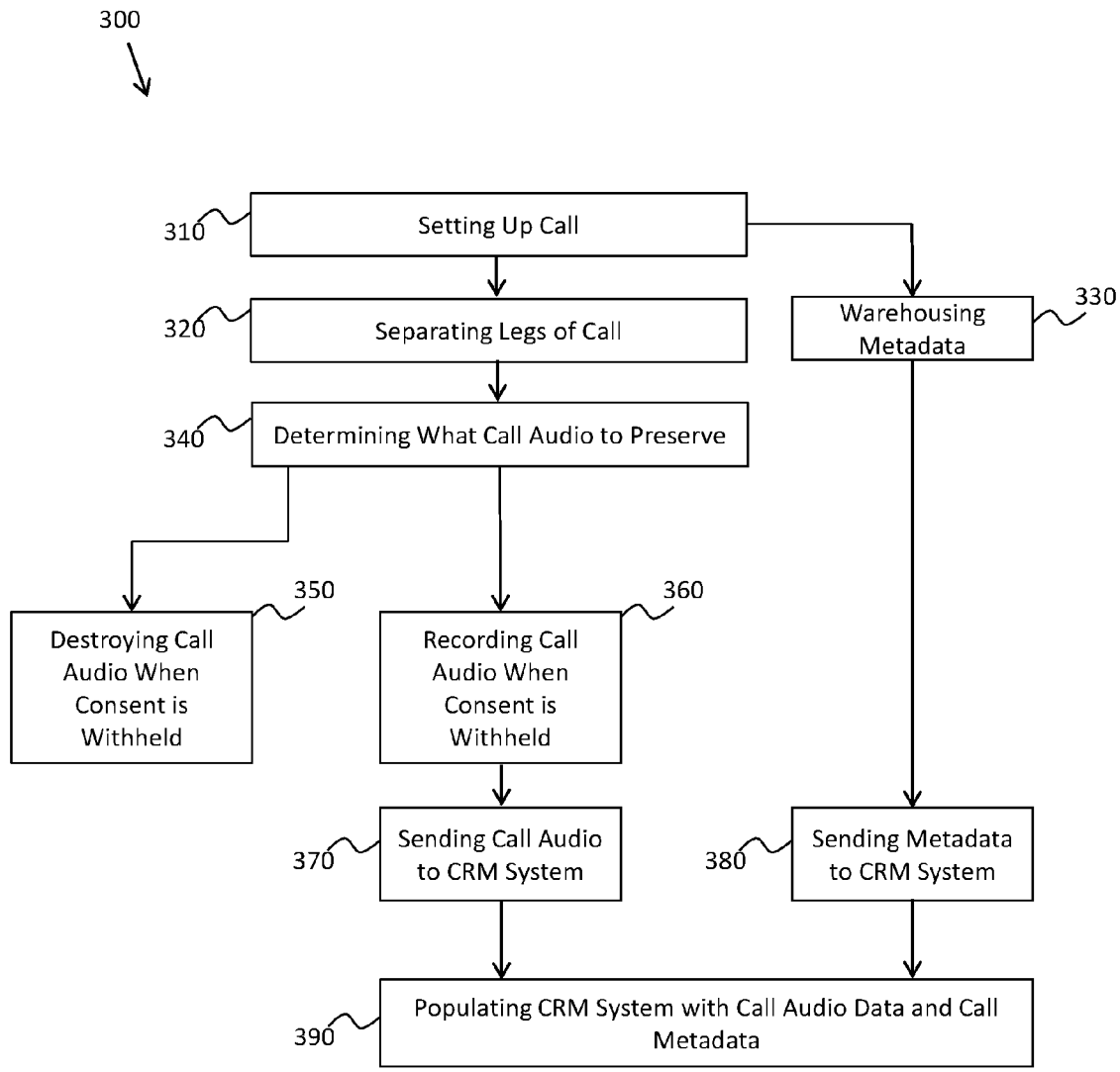
FIG. 3 illustrates an example method of automatically feeding a CRM system with call data according to some embodiments of the present technology.

FIG. 3 illustrates an example method 300 of automatically feeding a CRM system with call data according to some embodiments of the present technology. The method 300 begins with setting up a call 310 between a customer of the MVNO that has access to a CRM system and an additional party, warehousing the call metadata for both parties 330, and separating the portions of the call 320 to create two isolated audio portions. Next, the method 300 involves determining which portions of call audio to preserve 340. When consent to preserve call audio is withheld, the method 300 involves destroying the call audio 350. Conversely, when consent is provided, the method 300 involves recording (or preserving) call audio 360.

Next, the method 300 involves sending preserved call audio to a CRM system 370, sending call metadata to the CRM system 380, and populating the CRM system 390 with the audio and metadata.

Call metadata and preserved call audio data can be provided to users within an enterprise in a wide variety of ways. For example, parties of the call can access the information themselves, a caller's administrative assistants can be given access to the data, a manager of a team can be given access to the data for the purpose of aggregating data (e.g. to understand sales performance), etc.

Likewise, the virtual network service platform can provide various interfaces for annotating and updating the call records and sharing workflows. For example, call records can be sent via email, shared in a calendar application, shared via an API, shared along with a customer code, etc.

Also, the virtual network service platform can be configured to provide tools for searching and providing Boolean queries, etc. to review call records and other communications. For example, the search tools in the virtual network service platform can allow a user to search by company, date/time range, as well as keywords in the content of calls or messages. Similarly, the virtual network service platform can include a text message search interface configured to search call records, annotations, and other communications by receiving a text message from a user and to respond in a reply text message with the results of the query.

Providing Contact Details for Parties on a Call

As explained above, a switch placed in an MVNO-hosted virtual network service platform can monitor the turn up and tear down of a call. This can involve obtaining the phone number for some or all of the parties on a call. The virtual network service platform can be configured to use the parties' phone numbers to obtain a wide variety of details relating to the party.

Figure 4:
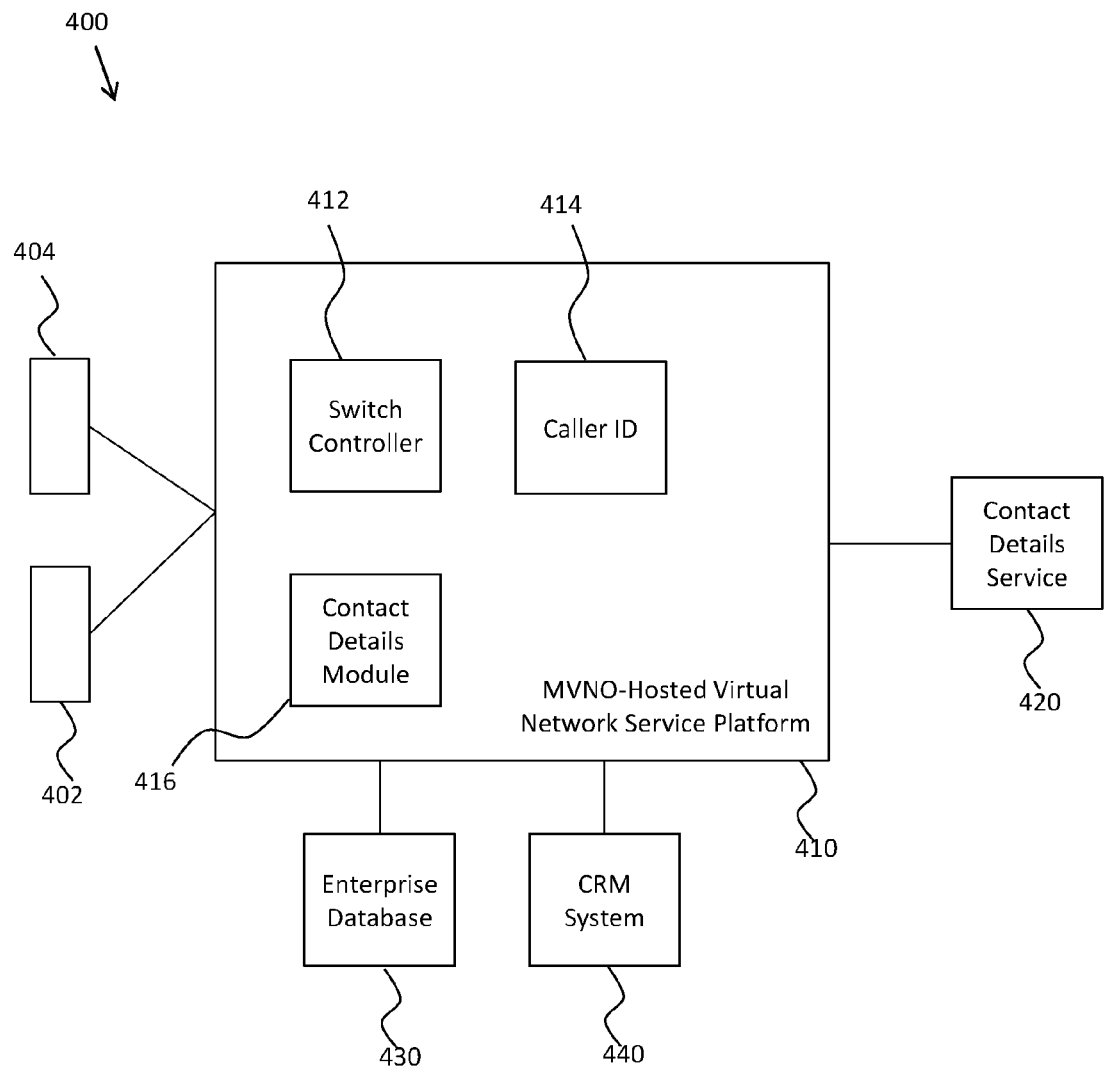
FIG. 4 illustrates an example system for obtaining contact details about the parties of a call according to some embodiments of the present technology.

FIG. 4 illustrates an example system 400 for obtaining contact details about the parties of a call according to some embodiments of the present technology. The system 400 includes a MVNO-hosted virtual network service platform 410 and one or more enterprise device 404 that is a customer of the MVNO.

The by the MVNO-hosted virtual network service platform 410 can connect the enterprise device 402 (e.g., origination or destination endpoint) with another communication device 404 (e.g., destination or origination endpoint) using a switch controller 412. For both calls placed by the enterprise device 404 and received by the enterprise device 404, the switch controller 412 can use the phone number for the other communication device 402 to obtain a name associated with the phone number using a caller ID module 414.

Having access to the phone number and user name associated with the communication device 402 allows the MVNO-hosted virtual network service platform 410 to obtain additional details about the user. In some embodiments of the present technology, the MVNO-hosted virtual network service platform 410 sends the user name and phone number to a contact details web service 420. The contact details web service 420 can find user details and send them back (e.g. via an API) to a contact details module 416 within the MVNO-hosted virtual network service platform 410.

In addition, the contact details module 416 can be configured to provide contact details when sending or after receiving text messages, multimedia messages, instant messages, email, social media requests, etc.

Examples of the types of contact details that can be obtained using name and phone number include name of the other party, the corporate title of the other party, the name of the company the other party works, the other party's email address, the best number to contact the other party, the other party's social media profiles, etc. Additionally, in some cases, this information can be cross-checked against a CRM system to automatically map out connections, relationships, patterns, etc. between the other party and the rest of the customer records.

In some embodiments of the present technology, the contact details can be presented to a user of the virtual network service platform during the duration of the phone call and can be also be preserved to access at some time in the future. In some embodiments, the contact details module 416 can send the enterprise device a text message with the contact details or with an executable link for bringing the user of the enterprise device 404 to a web interface, application, etc. for viewing the contact details. The information can also be automatically presented on a graphical user interface of the enterprise device 404. In some cases, the contact details can automatically be fed to another web service, application, or platform through an API, as explained above. For example, the contact details can be fed directly to a customer relationship management (CRM) system as part of a customer record. As shown in FIG. 4, the contact details can be sent to an enterprise database 430, to a CRM system 440, or directly to the enterprise device 404.

Providing Access to Call Data Records

Another advantage of having access to the turn up and tear down information of a call (e.g. via a switch controller) is that the MVNO-hosted virtual network service platform can send customers of the MVNO a message providing access to the gathered data. In some embodiments the MVNO-hosted virtual network service platform can include a record access module for sending MVNO customers access to the customer record for another party to a call, call metadata, recorded audio data, contact details, etc. For example, when a call is completed, a switch controller can use a teardown notification to automatically instruct the record access module to interface with an SMS server for sending a text message to the MVNO customer linking them to the customer record that includes a space for annotating the customer interaction. In some cases, the customer can also respond to the text message and the response can be used for providing the customer's annotations in the notes section of the CRM system.

The annotations provided by the MVNO customer can make specific reference to names, dates, monetary figures, etc. These specific references can be processed and can be used to create follow-up reminders, populate a calendar, modify a customer record, etc.

Advanced Conference Call Features

Providing switch control to an MVNO-hosted virtual network service platform can allow the MNVO to provide its customers with advanced call features (e.g., such as conference call features). Some advanced call features include using text messages to provide access to a call, providing participant contact details, defining participants' call permissions, etc.

In some cases, a MVNO-hosted virtual network service platform includes a switch controller that monitors a call application (internal application, partner call application server, etc.) used by a MNVO customer to set up a call. The switch controller can detect when a third party attempts to join the call and can alert the MVNO customer with the third party's details (e.g. number, name, full contact details, etc.) and the virtual network service platform can provide tools for adding the third party to the call or an isolated portion of the call. For example, in some embodiments, the virtual network service platform can be coupled with an SMS server that can be configured to send the MVNO customer a text message when a third party attempts to join a call that identifies the third party and provides details on how to permit or deny the third party to join the call. In some cases, the MVNO customer can reply to the text message to permit the third party to join the call. Similarly, the text message can explain a number of response options for allowing the third party with levels of access to the call. For example, a first response type (e.g. typing the word "allow") can provide the third party full access to the call while a second response type (e.g. typing the word "listen") can limit the third party's access to the call as only a listener, i.e. eavesdrop. In some embodiments, parties can be added to a call by determining a group of participants (e.g. by receiving input from the moderator's computer, receiving a text message from the moderator, accessing the parties of a calendar invite, etc.) and calling or sending a message to the parties when the call or conference begins. Answering the call or clicking a link in the text message can connect the party into the call.

Figure 5:
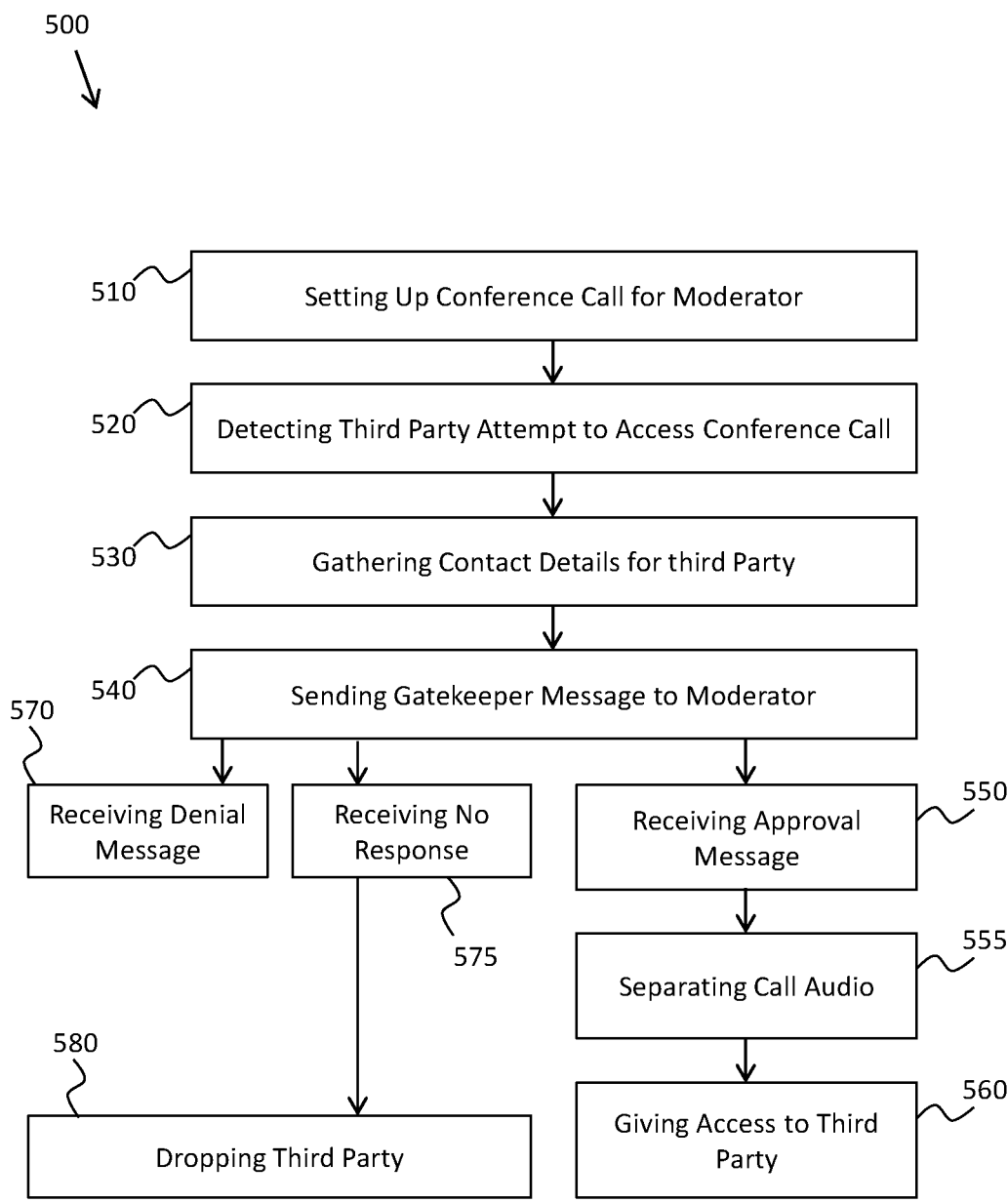
FIG. 5 illustrates a method of providing gatekeeping tools to a call moderator according to some embodiments of the present technology.

FIG. 5 illustrates a method 500 of providing gatekeeping tools to a call moderator according to some embodiments of the present technology. The method 500 begins with the virtual network service platform setting up a call (e.g., a conference call bridge) for a call moderator 510 and a switch controller in the virtual network service platform detecting a third party attempting to join the call 520. The method 500 can include the virtual network service platform gathering contact details for the third party 530.

The virtual network service platform can cause a gatekeeping message 540 to be sent to the moderator describing the third party and providing the options for allowing the third party to access the call. In response to receiving a reply message from the moderator 550 indicating acceptance, the method 500 can involve separating the call audio into portions 555, and giving the third party access to the call audio portions according to the reply 560. Alternatively, upon receiving a response with a denial 570 or receiving no response at all within a predetermined period of time 575, the method 500 can involve the virtual network service platform dropping the third party from the call 580

The virtual network service platform and the SMS server can also provide the MVNO with a text message identifying the third party and including a link to an interface with tools for permitting or denying access and other call gatekeeping tools. In some embodiments, the virtual network service platform can be configured with advanced call features that are extended to controlling who can take control of a shared application (e.g. shared document, shared whiteboard, etc.) and control the permissions users have with the shared application.

Likewise, the switch controller can segregate users into subsets of call participants and the virtual network service platform can control viewing access, editing access, etc. to the various subsets of participants. Similarly, the virtual network service platform can be configured to provide the parties, or a subset of the parties, with a group-messaging interface for sending messages, pictures, charts, etc. during a call.

In addition to text messages sent to a phone, a moderator that creates a call using a web interface can be provided with gatekeeping tools and other advanced controls through the web interface.

Further call gatekeeping tools can include tools for adding a third party to a call in a limited capacity (eavesdrop only, whisper to one portion only, etc.). The call gatekeeping tools provided by the virtual network service platform can also be used to allow the MVNO customer with the ability to decide whether or not to announce to a third party that they will be recorded, thereby informing the virtual network service platform about whether or not to record the call and send the call audio to the third party.

System Embodiments

Figure 6A:
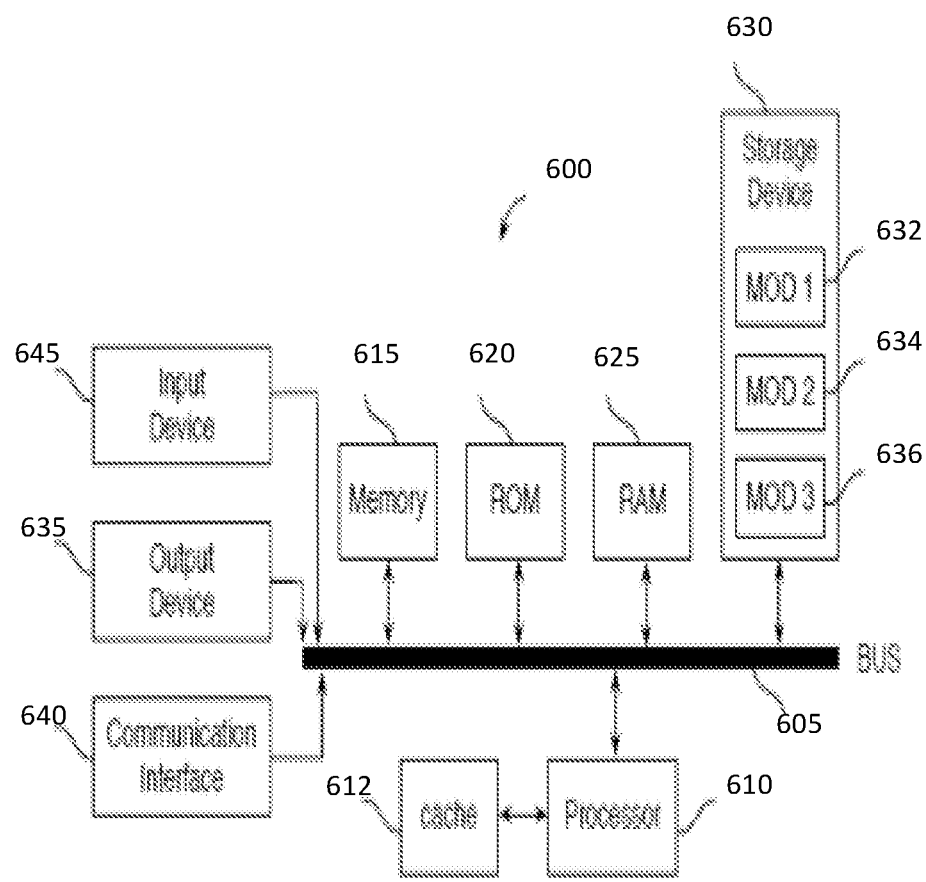
FIGS. 6A and 6B illustrate example possible system embodiments.
Figure 6B:
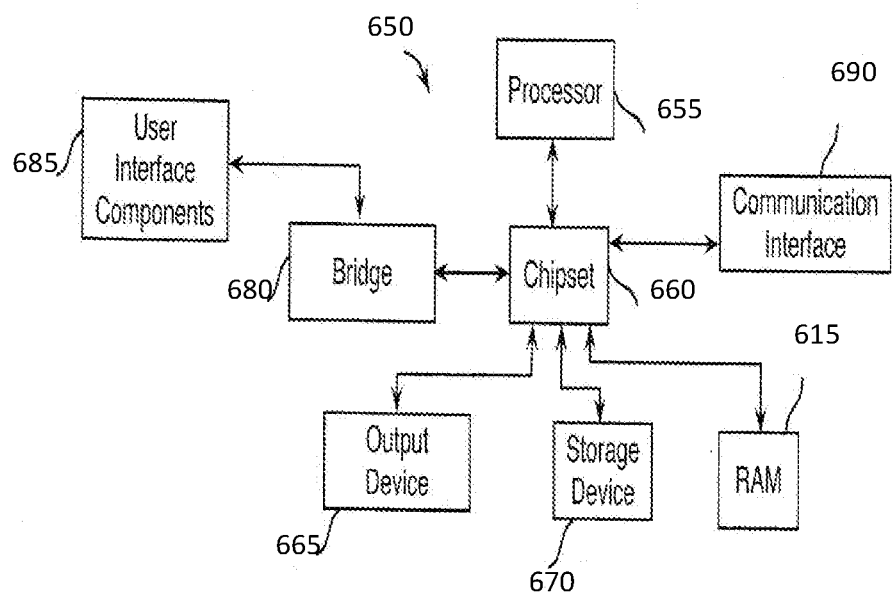

FIG. 6A and FIG. 6B illustrate example possible system embodiments. The more appropriate embodiment will be apparent to those of ordinary skill in the art when practicing the present technology. Persons of ordinary skill in the art will also readily appreciate that other system embodiments are possible.

FIG. 6A illustrates a conventional system bus computing system architecture 600 wherein the components of the system are in electrical communication with each other using a bus 605. Example system 600 includes a processing unit (CPU or processor) 610 and a system bus 605 that couples various system components including the system memory 615, such as read only memory (ROM) 620 and random access memory (RAM) 625, to the processor 610. The system 600 can include a cache of high-speed memory connected directly with, in close proximity to, or integrated as part of the processor 610. The system 600 can copy data from the memory 615 and/or the storage device 630 to the cache 612 for quick access by the processor 610. In this way, the cache can provide a performance boost that avoids processor 610 delays while waiting for data. These and other modules can control or be configured to control the processor 610 to perform various actions. Other system memory 615 may be available for use as well. The memory 615 can include multiple different types of memory with different performance characteristics. The processor 610 can include any general purpose processor and a hardware module or software module, such as module 1 632, module 2 634, and module 3 636 stored in storage device 630, configured to control the processor 610 as well as a special-purpose processor where software instructions are incorporated into the actual processor design. The processor 610 may essentially be a completely self-contained computing system, containing multiple cores or processors, a bus, memory controller, cache, etc. A multi-core processor may be symmetric or asymmetric.

To enable user interaction with the computing device 600, an input device 645 can represent any number of input mechanisms, such as a microphone for speech, a touch-sensitive screen for gesture or graphical input, keyboard, mouse, motion input, speech and so forth. An output device 635 can also be one or more of a number of output mechanisms known to those of skill in the art. In some instances, multimodal systems can enable a user to provide multiple types of input to communicate with the computing device 600. The communications interface 640 can generally govern and manage the user input and system output. There is no restriction on operating on any particular hardware arrangement and therefore the basic features here may easily be substituted for improved hardware or firmware arrangements as they are developed.

Storage device 630 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 625, read only memory (ROM) 620, and hybrids thereof.

The storage device 630 can include software modules 632, 634, 636 for controlling the processor 610. Other hardware or software modules are contemplated. The storage device 630 can be connected to the system bus 605. In one aspect, a hardware module that performs a particular function can include the software component stored in a computer-readable medium in connection with the necessary hardware components, such as the processor 610, bus 605, display 635, and so forth, to carry out the function.

FIG. 6B illustrates a computer system 650 having a chipset architecture that can be used in executing the described method and generating and displaying a graphical user interface (GUI). Computer system 650 is an example of computer hardware, software, and firmware that can be used to implement the disclosed technology. System 650 can include a processor 655, representative of any number of physically and/or logically distinct resources capable of executing software, firmware, and hardware configured to perform identified computations. Processor 655 can communicate with a chipset 660 that can control input to and output from processor 655. In this example, chipset 660 outputs information to output 665, such as a display, and can read and write information to storage device 670, which can include magnetic media, and solid state media, for example. Chipset 660 can also read data from and write data to RAM 675. A bridge 680 for interfacing with a variety of user interface components 685 can be provided for interfacing with chipset 660. Such user interface components 685 can include a keyboard, a microphone, touch detection and processing circuitry, a pointing device, such as a mouse, and so on. In general, inputs to system 650 can come from any of a variety of sources, machine generated and/or human generated.

Chipset 660 can also interface with one or more communication interfaces 690 that can have different physical interfaces. Such communication interfaces can include interfaces for wired and wireless local area networks, for broadband wireless networks, as well as personal area networks. Some applications of the methods for generating, displaying, and using the GUI disclosed herein can include receiving ordered datasets over the physical interface or be generated by the machine itself by processor 655 analyzing data stored in storage 670 or 675. Further, the machine can receive inputs from a user via user interface components 685 and execute appropriate functions, such as browsing functions by interpreting these inputs using processor 655.

It can be appreciated that example systems 600 and 650 can have more than one processor 610 or be part of a group or cluster of computing devices networked together to provide greater processing capability.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

The various embodiments described above are provided by way of illustration only and should not be construed to limit the scope of the disclosure. Those skilled in the art will readily recognize various modifications and changes that may be made to the principles described herein without following the example embodiments and applications illustrated and described herein, and without departing from the spirit and scope of the disclosure.

The invention claimed is:

1. A method comprising:
setting up a call between a mobile virtual network operator (MVNO) customer endpoint and an additional endpoint;
collecting and warehousing call metadata from the MVNO customer endpoint and the additional endpoint;
separating, using a switch controller within a mobile virtual network operator (MVNO) platform, call audio into one or more isolated audio portions;
determining that consent is given, from one or more of the MVNO customer endpoint and the additional endpoint, for storing the one or more isolated audio portions; and
sending the one or more isolated audio portions to a customer relationship management (CRM) system when consent is given.

2. The method of claim 1, further comprising:
providing, to a third party, access to listen to the call and the ability to inject audio into at least one of the one or more isolated audio portions.

3. The method of claim 1, further comprising:
providing, to a user that is authorized by the MVNO customer endpoint, a link to retrieve the call metadata from the CRM system.

4. The method of claim 1, further comprising:
providing, to the MVNO customer endpoint, a link to retrieve the audio portion for the MVNO customer endpoint.

5. The method of claim 1, further comprising:
determining that consent is withheld, from one or more of the MVNO customer endpoint and the additional endpoint, for storing the one or more isolated audio portions; and
disregarding the audio portion for the additional endpoint when consent is withheld.

6. The method of claim 1, further comprising:
detecting, in the switch controller, when the call is torn down,
sending, via a text message, a link to the isolated audio portions in the CRM system.

7. The method of claim 1, further comprising:
detecting, in the switch controller, when the call is torn down,
sending, via a text message, an interface for annotating the isolated audio portions in the CRM system.

8. The method of claim 1, further comprising:
obtaining, using the switch controller, the phone number for the additional endpoint;
obtaining, via a caller identification module, a name associated with the phone number; and
determining a set of contact details using the phone number and name.

9. The method of claim 8, further comprising:
exposing the contact details to the MVNO customer endpoint.

10. The method of claim 8, further comprising:
exposing the contact details in the CRM system.

11. A system comprising:
a processor;
a non-transitory computer-readable medium; and
computer-readable instructions stored thereon that, when executed by the processor, cause the system to:
set up a call between a mobile virtual network operator (MVNO) customer endpoint and an additional endpoint;
collect and warehousing call metadata from the MVNO customer endpoint and the additional endpoint;
separate, using a switch controller within a mobile virtual network operator (MVNO) platform, call audio into one or more isolated audio portions;
determine that consent is given, from one or more of the MVNO customer endpoint and the additional endpoint, for storing the one or more isolated audio portions; and
send the one or more isolated audio streams to a customer relationship management (CRM) system when consent is given.

12. The system of claim 11, wherein the computer-readable instructions, when executed by the processor, further cause the system to:
provide, to a third party, access to listen to the conference call and the ability to inject audio into at least one of the one or more isolated audio portions.

13. The system of claim 11, wherein the computer-readable instructions, when executed by the processor, further cause the system to:
determine that consent is withheld, from one or more of the MVNO customer endpoint and the additional endpoint, for storing the one or more isolated audio portions; and
disregard the audio portion for the additional endpoint when consent is withheld.

14. The system of claim 11, wherein the computer-readable instructions, when executed by the processor, further cause the system to:
detect, in the switch controller, when the call is torn down,
send, via a text message, a link to the one or more isolated audio portions in the CRM system.

15. The system of claim 11, wherein the computer-readable instructions, when executed by the processor, further cause the system to:
detect, in the switch controller, when the call is torn down,
send, via a text message, an interface for annotating the one or more isolated audio portions in the CRM system.

16. The system of claim 11, wherein the computer-readable instructions, when executed by the processor, further cause the system to:
obtain, using the switch controller, the phone number for the additional endpoint;
obtain, via a caller identification module, a name associated with the phone number; and
determine a set of contact details using the phone number and name.

17. The system of claim 15, wherein the computer-readable instructions, when executed by the processor, further cause the system to:
expose the contact details to the MVNO customer endpoint.

\* \* \* \* \*